US009967531B2

(12) United States Patent
Uemura et al.

(10) Patent No.: US 9,967,531 B2
(45) Date of Patent: May 8, 2018

(54) INFORMATION PROCESSING APPARATUS, METHOD OF ESTIMATING CURVE, AND IMAGE PROCESSING APPARATUS AND METHOD (71) Applicant: CANON KABUSHIKI KAISHA, Tokyo (JP)

(72) Inventors: Shinichi Uemura, Kawasaki (JP); Eisaku Tatsumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 14/960,620

(22) Filed: Dec. 7, 2015

(65) Prior Publication Data
US 2016/0163068 A1   Jun. 9, 2016

(30) Foreign Application Priority Data

Dec. 9, 2014   (JP) .................................. 2014-249198

(51) Int. Cl.
*H04N 9/31* (2006.01)
*G06T 17/30* (2006.01)
(52) U.S. Cl.
CPC ........... *H04N 9/3185* (2013.01); *G06T 17/30* (2013.01)
(58) Field of Classification Search
None
See application file for complete search history.

(56) References Cited

U.S. PATENT DOCUMENTS

| 4,124,885 | A | * | 11/1978 | Nordby | H02M 7/49 363/43 |
| 4,530,057 | A | * | 7/1985 | Ahlbom | G05D 1/0231 180/168 |
| 5,633,994 | A | * | 5/1997 | Kaizuka | G06T 17/30 345/419 |
| 5,742,751 | A | * | 4/1998 | Imanishi | G06T 11/203 345/442 |
| 6,600,485 | B1 | * | 7/2003 | Yoshida | G06T 17/30 345/419 |
| 6,963,350 | B1 | * | 11/2005 | Perani | G06T 11/001 345/619 |

(Continued)

FOREIGN PATENT DOCUMENTS

JP   2001-069434 A   3/2001

OTHER PUBLICATIONS

Jung, Jinwook, et al. "OWARU: Free space-aware timing-driven incremental placement." Computer-Aided Design (ICCAD), 2016 IEEE/ACM International Conference on. IEEE, 2016.*

(Continued)

*Primary Examiner* — Michelle M Hausmann
(74) *Attorney, Agent, or Firm* — Carter, DeLuca, Farrell & Schmidt, LLP (57) ABSTRACT

A plurality of anchor points at which a curve to be estimated passes sequentially through are set. Four anchor points which are successional are selected from the plurality of anchor points. First and second control points are set based on the selected anchor points. Quadratic Bezier curves connecting between the selected anchor points are calculated based on the selected anchor points and the first or second control point. Coordinate values of the curve to be estimated are estimated based on the quadratic Bezier curves.

9 Claims, 6 Drawing Sheets (56) References Cited

U.S. PATENT DOCUMENTS

| | | | | |
|---|---|---|---|---|
| 7,228,227 B2* | 6/2007 | Speer | ...................... | G01C 21/00 340/988 |
| 7,542,036 B2* | 6/2009 | Museth | ................... | G06T 17/00 345/420 |
| 7,545,303 B1* | 6/2009 | Silva | ......................... | G06J 1/00 341/143 |
| 2006/0015247 A1* | 1/2006 | Speer | ..................... | G01C 21/00 701/467 |
| 2008/0137961 A1* | 6/2008 | Ishida | .................... | G06K 9/481 382/197 |
| 2009/0279802 A1* | 11/2009 | Ishida | ...................... | G06K 9/48 382/242 |
| 2012/0051655 A1* | 3/2012 | Oto | ......................... | G06K 9/481 382/199 |
| 2012/0235988 A1* | 9/2012 | Karafin | ................ | H04N 13/026 345/419 |
| 2013/0278594 A1* | 10/2013 | Kaatz | .................... | G06T 11/203 345/419 |
| 2014/0237429 A1* | 8/2014 | Abrahami | ............. | G06T 11/001 715/835 |
| 2014/0247276 A1* | 9/2014 | Pedreira | ................ | G06T 11/203 345/610 |

OTHER PUBLICATIONS

Gary, G. Allen, Qiang Hu, and Jong Kwan Lee. "A rapid, manual method to map coronal-loop structures of an active region using cubic Bézier curves and its applications to misalignment angle analysis." Solar Physics 289.3 (2014): 847-865.*

* cited by examiner

FIG. 6 ued States Patent

INFORMATION PROCESSING APPARATUS, METHOD OF ESTIMATING CURVE, AND IMAGE PROCESSING APPARATUS AND METHOD

BACKGROUND OF THE INVENTION

Field of the Invention

The present invention relates to a technique of correcting the distortion of an image when displaying or projecting an image on a curved surface.

Description of the Related Art

To correct the distortion of an image when an image is projected on a curved surface, there is known a method of storing coordinates (to be referred to as "deformed coordinates" hereinafter) on a curved surface that correspond to grid points obtained by dividing a screen, supplementing the deformed coordinates between the grid points, and deforming an image to be projected (Japanese Patent Laid-Open No. 2001-069434). According to this method, the smaller the interval between grid points is, the smoother image deformation can be performed.

However, the smaller the interval between grid points is, the larger the data amount of deformed coordinate information becomes, the procedure to set deformed coordinate data for many grid points takes a long time, and the operation for deforming an image becomes complicated. To solve this, there is conceivable a method of sampling several grid points, setting deformed coordinate data corresponding to the sampled grid points, performing interpolation processing on deformed grid point data representing curves between the sampled grid points, and setting the interpolated deformed grid point data at grid points between the sampled grid points. This method can simplify the procedure to set deformed coordinate data, and smooth the operation for deforming an image.

As one method for performing interpolation processing of a curve, a Bezier curve based on a Bezier function with a small calculation amount is used. In general, the Bezier curve needs to be set between a start point and terminal point serving as anchor points using, as an indicating point, a control point for adjusting a curve. However, the control point does not exist on a curve to be interpolated, so it is difficult to calculate a desired curve between the start point and the terminal point.

To solve this, the following quadratic Bezier curve calculation method is known. First, the midpoint of a line segment connecting a start point and a terminal point is obtained in a state in which three anchor points serving as the start point, intermediate point, and terminal point of a quadratic Bezier curve exist. Then, a control point is set at a position having point symmetry with the midpoint using the intermediate point as the center, and a curve passing through the three anchor points is calculated.

The problem of poor deformation accuracy arises when an image is deformed based on a curved surface (cylinder, sphere, or prism) obtained by applying a curve obtained by the above-mentioned quadratic Bezier curve calculation method to supplement deformed coordinates between grid points. For example, it is known that a visually recognizable error (0.1 pixels or more) is generated in many patterns, from a comparison between the coordinate values of an ideal curved surface, and the coordinate values of an interpolated curved surface to which a curve estimated by the quadratic Bezier curve calculation method is applied.

SUMMARY OF THE INVENTION

In one aspect, an information processing apparatus comprising: an anchor point setting unit configured to set a plurality of anchor points at which a curve to be estimated passes sequentially through; a selection unit configured to select four anchor points which are successional from the plurality of anchor points, wherein the selection is sequentially performed from a start side or terminal side of the curve to be estimated; a control point setting unit configured to set first and second control points based on the selected anchor points; a calculation unit configured to calculate quadratic Bezier curves connecting between the selected anchor points based on the selected anchor points and the first or second control point; and a curve estimation unit configured to estimate coordinate values of the curve to be estimated based on the quadratic Bezier curves.

According to the aspect, the estimation accuracy of a curve sequentially passing through a plurality of anchor points can be increased.

Further features of the present invention will become apparent from the following description of exemplary embodiments with reference to the attached drawings.

DESCRIPTION OF THE EMBODIMENTS

An information processing apparatus, a method of estimating a curve, an image processing apparatus, and an image processing method according to embodiments of the present invention will now be described with reference to the accompanying drawings. It is to be understood that the following embodiments are not intended to limit the claims of the present invention, and that not all the combinations of arrangements that are described in the following embodiments are indispensable for solving the problems in the present invention.

First Embodiment

[Information Processing Apparatus]

Figure 1:
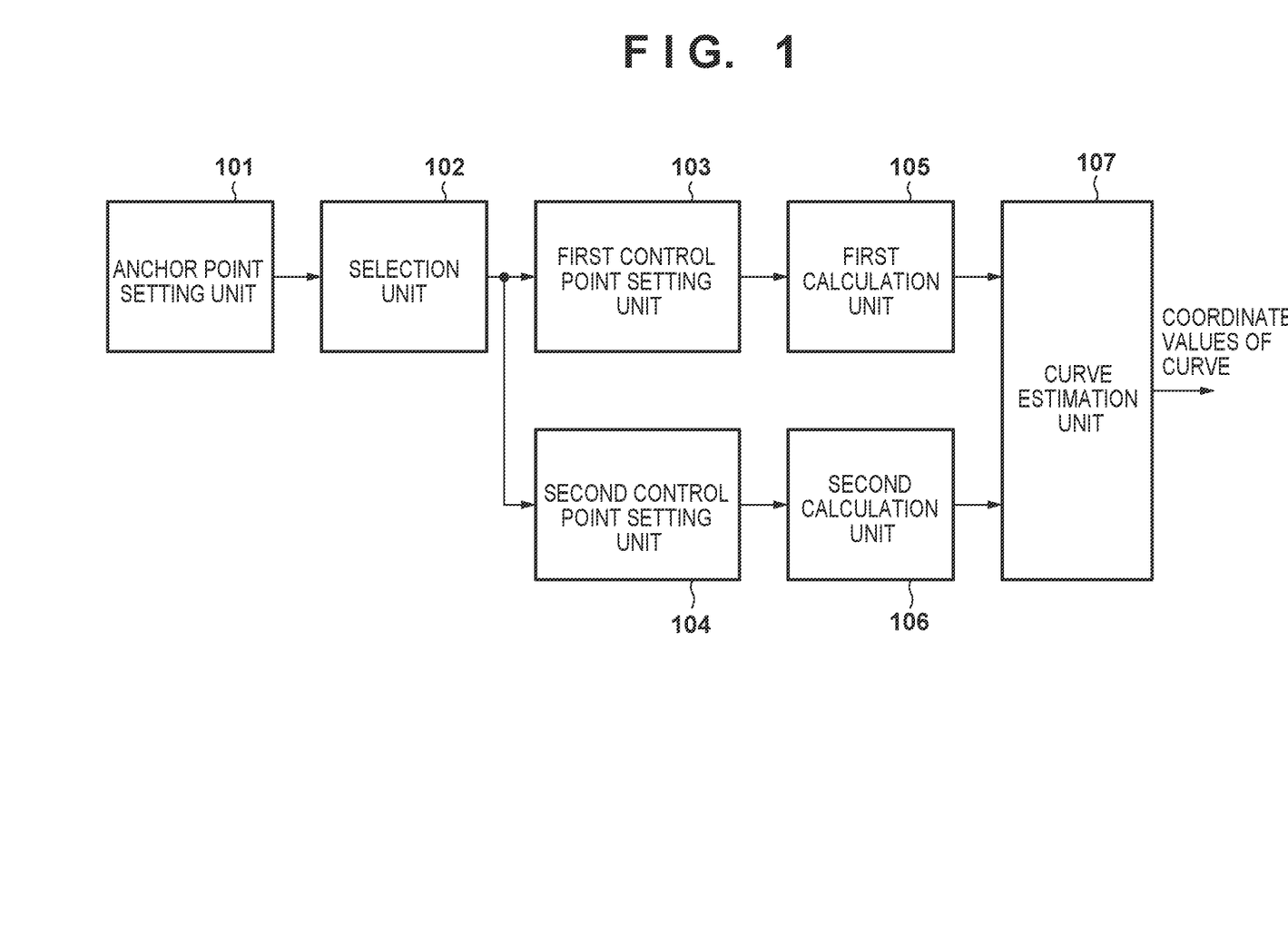
FIG. 1 is a block diagram showing the processing arrangement of an information processing apparatus that performs curve estimation processing according to a first embodiment.

FIG. 1 is a block diagram showing the processing arrangement of an information processing apparatus, according to the first embodiment, that performs curve estimation processing when supplementing deformed coordinates between grid points. Curve estimation processing will be explained below with reference to FIGS. 3A to 3C.

Figure 3A:
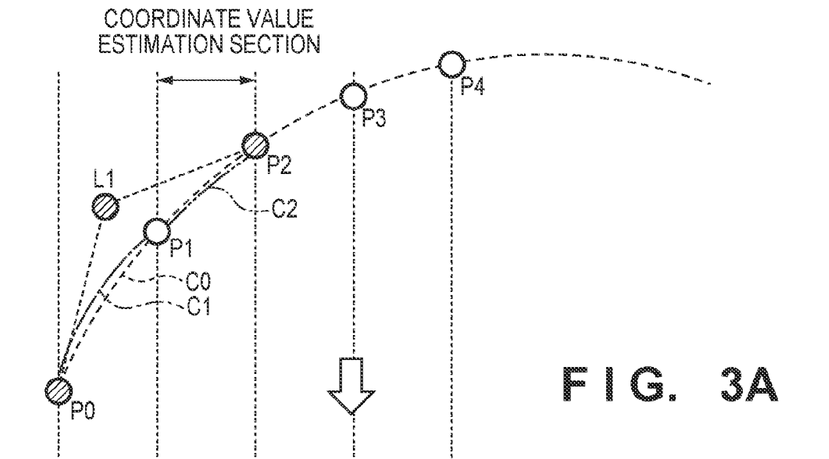
FIGS. 3A to 3C are views for explaining curve estimation processing.

An anchor point setting unit 101 sets anchor points at a large interval through which a curve sequentially passes. FIG. 3A shows set anchor points P0 to P4. Note that the sampling frequency of a curve based on anchor points is set to be a frequency double or higher than the frequency of the curve. In other words, the number of set anchor points needs to be double or larger than a set (wave number) of a local maximum value and local minimum value of the curve at the interval between the set anchor points.

A selection unit 102 selects successional four anchor points. Assume that the four anchor points P0 to P3 are selected in FIG. 3A.

A first control point setting unit 103 obtains the three anchor points P0, P1, and P2 located in one end (start side of the curve) from the selected successional four anchor points. Then, the first control point setting unit 103 obtains the midpoint of a line segment connecting the anchor point P0 located on the most start side, out of the three anchor points, and the anchor point P2 located on the most terminate side. The first control point setting unit 103 sets, as the center, the anchor point P1 located at the middle of the three anchor points, and sets a control point L1 at a position having point symmetry with the midpoint.

By using the anchor points P0 and P2 and the control point L1, a first calculation unit 105 calculates quadratic Bezier curves C1 and C2 that connect the anchor points P0, P1, and P2. The calculated quadratic Bezier curves include an error, and the sign of the error is inverted at the boundary of the intermediate anchor point P1, compared to the coordinate value (to be referred to as an "ideal coordinate value" hereinafter) of an ideal curve C0 shown in FIG. 3A. For example, the coordinate value of the curve C1 of the first half includes a positive error with respect to the ideal coordinate value, and the coordinate value of the curve C2 of the second half includes a negative error with respect to the ideal coordinate value.

Figure 3B:
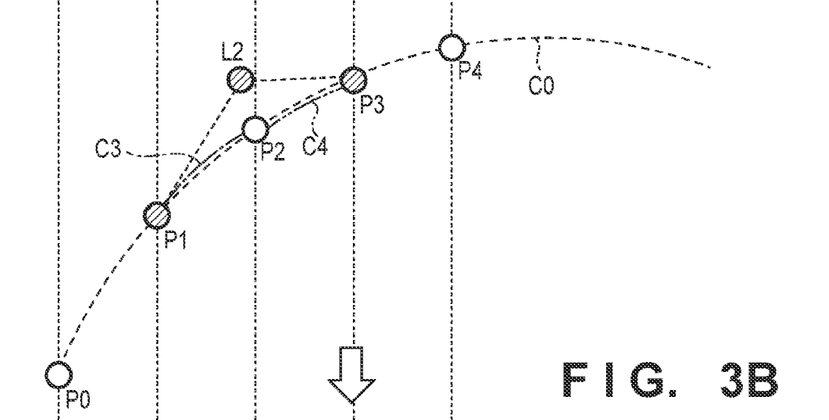

A second control point setting unit 104 and a second calculation unit 106 calculate quadratic Bezier curves for the other set of anchor points by the same procedures. As shown in FIG. 3B, the second control point setting unit 104 obtains the three anchor points P1, P2, and P3 located in the other end (terminate side of the curve) with respect to one end from the successional four anchor points selected by the selection unit 102. Then, the second control point setting unit 104 obtains the midpoint of a line segment connecting the anchor point P1 located on the most start side, out of the three anchor points, and the anchor point P3 located on the most terminate side. The second control point setting unit 104 sets, as the center, the anchor point P2 located at the middle of the three anchor points, and sets a control point L2 at a position having point symmetry with the midpoint.

By using the anchor points P1 and P3 and the control point L2, the second calculation unit 106 calculates quadratic Bezier curves C3 and C4 that connect the anchor points P1, P2, and P3. The calculated quadratic Bezier curves also include an error, as described above. At the boundary of the intermediate anchor point P2, the coordinate value of the curve C3 of the first half includes a positive error with respect to the ideal coordinate value, and the coordinate value of the curve C4 of the second half includes a negative error with respect to the ideal coordinate value, compared to the ideal coordinate value of the ideal curve C0 shown in FIG. 3B.

Figure 3C:
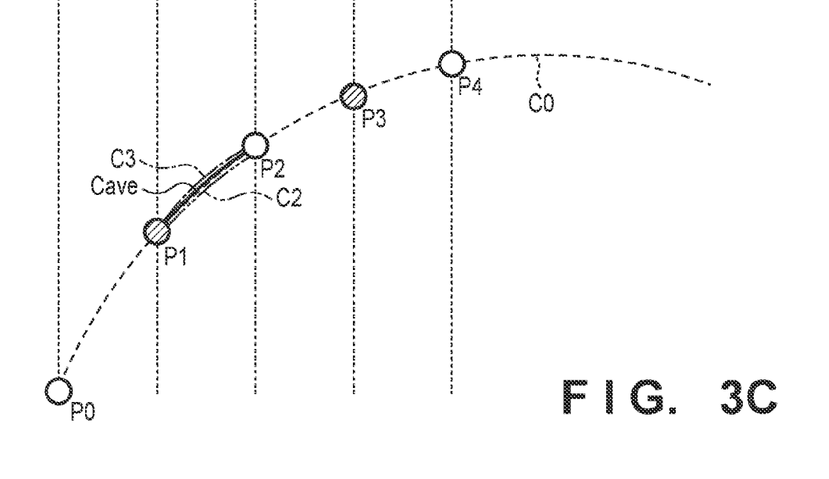

A curve estimation unit 107 calculates, from the quadratic Bezier curves calculated by the first calculation unit 105 and the quadratic Bezier curves calculated by the second calculation unit 106, the coordinate value of a curve Cave in a section P1-P2 in which the plurality of quadratic Bezier curves have been calculated. More specifically, as shown in FIG. 3C, the average value of the coordinate value of the curve C2 and the coordinate value of the curve C3 is calculated as the coordinate value of the curve Cave in the section P1-P2. The sign of the error added to the curve C2 and the sign of the error added to the curve C3 are inverted, so the curve Cave comes close to the ideal curve C0 by averaging the coordinate values of the curves C2 and C3, and the calculation accuracy of curve estimation processing can be increased.

FIG. 1 shows an example in which processes by the two systems, that is, by the first control point setting unit 103 and first calculation unit 105 and by the second control point setting unit 104 and second calculation unit 106 are parallelly performed. The processes by the two systems may not be limited to parallel processes and may be executed in series. Alternatively, loop processing may be performed by one pair of the control point setting unit and calculation unit.

[Curve Estimation Processing]

Figure 4:
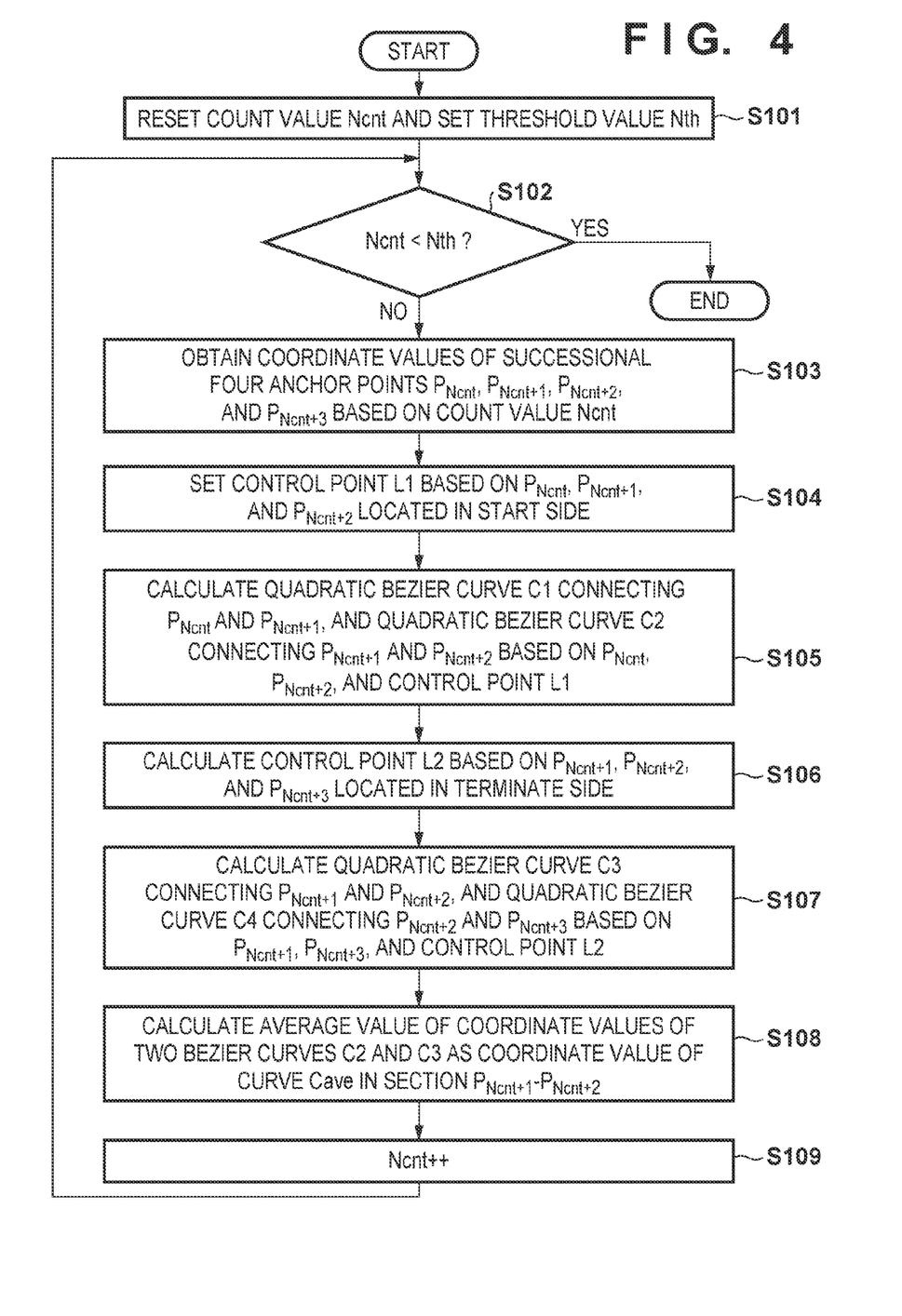
FIG. 4 is a flowchart showing curve estimation processing.

Curve estimation processing will be explained in detail with reference to the flowchart of FIG. 4. In the following description, the example in FIGS. 3A to 3C will be referred to for convenience.

The selection unit 102 resets, to a predetermined initial value, a count value Ncnt of a counter that counts anchor points, and sets a threshold value Nth in curve estimation processing (S101). The initial value of the count value Ncnt is, for example, 0. Curve estimation processing is performed for every successional four anchor points. When the number of anchor points of a Bezier curve is M, the threshold value Nth is M−3.

Then, the selection unit 102 compares the threshold value Nth and the count value Ncnt in curve estimation processing (S102). If the count value Ncnt is smaller than the threshold value Nth, the selection unit 102 advances the process to step S103. If the count value Ncnt is equal to or larger than the threshold value Nth, the selection unit 102 ends curve estimation processing.

If Ncnt<Nth, the selection unit 102 obtains the coordinate values of successional four anchor points $P_{Ncnt}$, $P_{Ncnt+1}$, $P_{Ncnt+2}$, and $P_{Ncnt+3}$ sequentially from the start side of the curve based on the count value Ncnt (S103). For example, when the count value Ncnt=0, the coordinate values of the anchor points P0, P1, P2, and P3 are obtained.

The first control point setting unit 103 obtains the three anchor points $P_{Ncnt}$, $P_{Ncnt+1}$, and $P_{Ncnt+2}$ located in one end (start side) based on the four coordinate values, and obtains the midpoint of a line segment connecting $P_{Ncnt}$ located on the most start side, and $P_{Ncnt+2}$ located on the most terminate side, out of the three anchor points. The first control point setting unit 103 sets, as the center, $P_{Ncnt+1}$ located at the middle of the three anchor points, and sets the control point L1 at a position having point symmetry with the midpoint (S104).

Based on the anchor points $P_{Ncnt}$ and $P_{Ncnt+2}$ and the control point L1, the first calculation unit 105 calculates the quadratic Bezier curve C1 connecting the anchor points $P_{Ncnt}$ and $P_{Ncnt+1}$ and the quadratic Bezier curve C2 connecting the anchor points $P_{Ncnt+1}$ and $P_{Ncnt+2}$ (S105).

The second control point setting unit 104 obtains the coordinate values of the three anchor points $P_{Ncnt+1}$, $P_{Ncnt+2}$, and $P_{Ncnt+3}$ located on the other end (terminate side) based on the four coordinate values, and obtains the midpoint of a line segment connecting $P_{Ncnt+1}$ located on the most start side and $P_{Ncnt+3}$ located on the most terminate side, out of the three anchor points. The second control point setting unit 104 sets, as the center, $P_{Ncnt+2}$ located at the middle of the three anchor points, and sets the control point L2 at a position having point symmetry with the midpoint (S106).

Based on the anchor points $P_{Ncnt+1}$ and $P_{Ncnt+3}$ and the control point L2, the second calculation unit 106 calculates the quadratic Bezier curve C3 connecting the anchor points $P_{Ncnt+1}$ and $P_{Ncnt+2}$ and the quadratic Bezier curve C4 connecting the anchor points $P_{Ncnt+2}$ and $P_{Ncnt+3}$ (S107).

The curve estimation unit 107 calculates the average value of the coordinate values of the two Bezier curves C2 and C3 as the coordinate value of the curve Cave in the section $P_{Ncnt+1}$-$P_{Ncnt+2}$ in which the two calculated pairs of the quadratic Bezier curves C1 and C2 and the quadratic Bezier curves C3 and C4 overlap each other (S108). For example, when Ncnt=0, the coordinate value of the curve Cave in the section P1-P2 is determined.

After that, the selection unit 102 increments the count value Ncnt (S109), and returns the process to step S102. For example, when the count value Ncnt is incremented from 0 to 1, one end (anterior side) moves from the anchor point P0 to the next anchor point P1. In the processes of steps S103 to S108, the successional four anchor points P1, P2, P3, and P4 serve as processing targets, and the coordinate value of the curve Cave in the section P2-P3 in which the two pairs of quadratic Bezier curves overlap each other is determined.

In this manner, the average coordinate value of two Bezier curves calculated between anchor points is set as the coordinate value of a curve to be designated, thereby increasing the estimation accuracy of a curve to be applied to supplement deformed coordinates between grid points. This can increase the deformation accuracy of an image when projecting the image on a curved surface indicated by supplemented deformed coordinates.

Modification of First Embodiment

The first embodiment has described an example in which successional four anchor points are selected sequentially from the start side of a curve to be estimated. However, successional four anchor points may be selected sequentially from the terminate side of a curve to be estimated.

In this case, the selection unit 102 sets "the number M of anchor points or M−3" as the initial value of the count value Ncnt of the counter that counts anchor points, and sets "3 or 0" as the threshold value Nth (S101). If the selection unit 102 determines in step S102 that Ncnt>Nth, it advances the process to step S103. If the selection unit 102 determines in step S102 that Ncnt≤Nth, it ends curve estimation processing. Further, the selection unit 102 decrements the count value Ncnt (S109), and returns the process to step S102.

Although an example in which a curve is interpolated has been described above, the same processing is also possible for interpolation of a curved surface.

Second Embodiment

An image processing apparatus and an image processing method according to the second embodiment of the present invention will be described. The second embodiment will explain an example in which, when displaying or projecting an image on a curved surface, correction of the distortion of the displayed image or projected image is performed by applying curve estimation processing according to the above-described first embodiment.

[Image Processing Apparatus]

Figure 2:
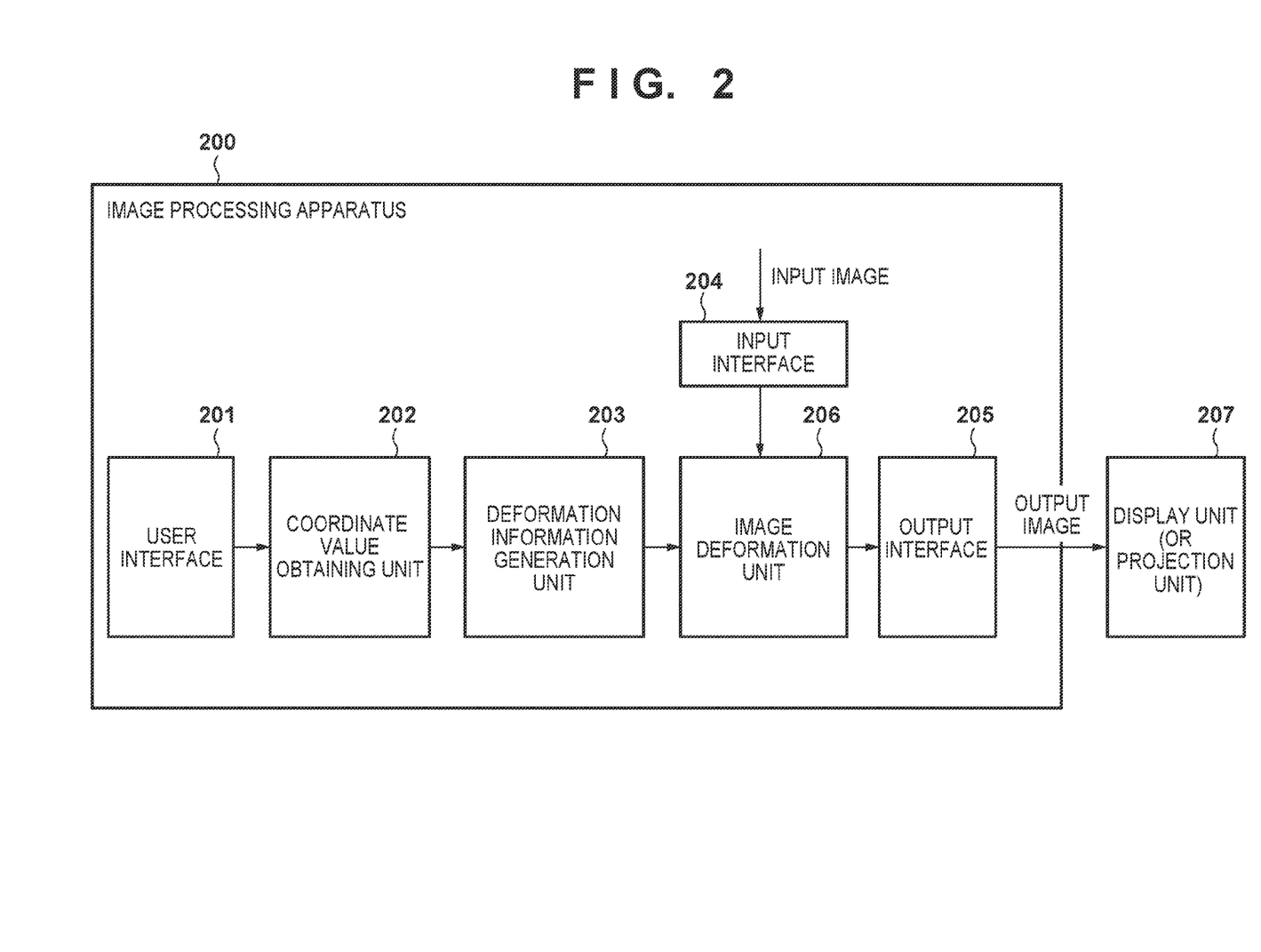
FIG. 2 is a block diagram showing the arrangement of an image processing apparatus according to a second embodiment.

FIG. 2 is a block diagram showing the arrangement of an image processing apparatus 200 that generates an output image for display or projection by deformation processing of an image to which curve estimation processing described in the first embodiment has been applied.

In FIG. 2, a user interface 201 is an interface for inputting an instruction and various data by a user. A coordinate value obtaining unit 202 stores the coordinate values of grid points (to be referred to as "coarse grid points" hereinafter) set by sampling coordinate values on a screen at a large interval, and obtains the deformed coordinate values of the coarse grid points (to be described later). A deformation information generation unit 203 calculates the deformed coordinate values of grid points (to be referred to as "dense grid points" hereinafter) at a small interval from the deformed coordinate values of the coarse grid points, and generates deformation information necessary to deform an image.

An input interface 204 is an interface for inputting an image to be displayed or projected. An image deformation unit 206 generates an output image by performing geometrical deformation on an input image based on deformation information. An output interface 205 is an interface for outputting an output image to a display unit 207 such as a non-flat monitor (or a projection unit such as a projection device).

When a test image is input through the input interface 204, the image deformation unit 206 outputs the test image as an output image to the output interface 205 without performing deformation processing. Hence, the image not deformed from the test image is displayed or projected. The test image is, for example, an image representing grids or grid points, and the user can measure the coordinate values (to be referred to as "output coordinate values" hereinafter) of the grid points on the displayed image or projected image.

Then, the user inputs, through the user interface 201, information of a curved surface (to be referred to as "curved surface information" hereinafter), on which an image is displayed or projected, that is necessary to correct the distortion of the displayed image or projected image. The curved surface information is, for example, information indicating the output coordinate values of grid points on the displayed image or projected image, which have been measured at the time of displaying or projecting the test image, and representing the display surface or projection surface (curved surface).

The coordinate value obtaining unit 202 stores in advance the coordinate values of coarse grid points set by sampling, at a predetermined large interval, coordinates on a flat surface (screen) of a size corresponding to the test image. The coordinate values of the coarse grid points correspond to the coordinate values (to be referred to as "test coordinate values" hereinafter) of grid points represented by the test image. The coordinate value obtaining unit 202 obtains the correspondence between the test coordinate values and the output coordinate values based on the curved surface information input by the user. In other words, the coordinate value obtaining unit 202 obtains the coordinate values (to be referred to as "deformed coordinate values" hereinafter) of grid points on the curved surface that correspond to the coordinate values of the coarse grid points set on the flat surface (screen) corresponding to the test image.

The deformation information generation unit 203 receives the deformed coordinate values of the coarse grid points, and calculates the deformed coordinate values of dense grid points between the coarse grid points at high accuracy by curve estimation processing described in the first embodiment. In other words, the deformed coordinate values of the coarse grid points are set as anchor points in the first embodiment, a curve sequentially passing through a plurality of anchor points is estimated using calculation of a quadratic Bezier curve, and dense grid points are disposed on the curve sequentially passing through the plurality of anchor points (plurality of coarse grid points). The deformation information generation unit 203 generates deformation information representing the relationship between the coordinate values and deformed coordinate values of the coarse grid points and the coordinate values and deformed coordinate values of the dense grid points. The deformation information generation unit 203 then outputs the deformation information to the image deformation unit 206.

In this way, the deformation information generation unit 203 functions as the anchor point setting unit 101, the selection unit 102, the first and second control point setting units 103 and 104, the first and second calculation units 105 and 106, and the curve estimation unit 107 in the first embodiment. Accordingly, grid points that have deformed coordinate values corresponding to the display surface or projection surface (curved surface) of an output image and are densely disposed are obtained.

When an input image to be displayed or projected is input through the input interface 204, the image deformation unit 206 performs geometrical deformation on the input image based on deformation information, and outputs the deformed image as an output image to the output interface 205. The output image obtained by deforming the input image in accordance with the display surface or projection surface is displayed or projected, and the distortion of the displayed image or projected image can be suppressed.

As described above, when correcting the distortion of an image to be displayed or projected on a curved surface, curve estimation processing described in the first embodiment is applied to calculation of the deformed coordinate values of dense grid points from the deformed coordinate values of coarse grid points. An image processing apparatus that performs high-accuracy image deformation processing can therefore be provided.

[Image Deformation Processing]

Figure 5:
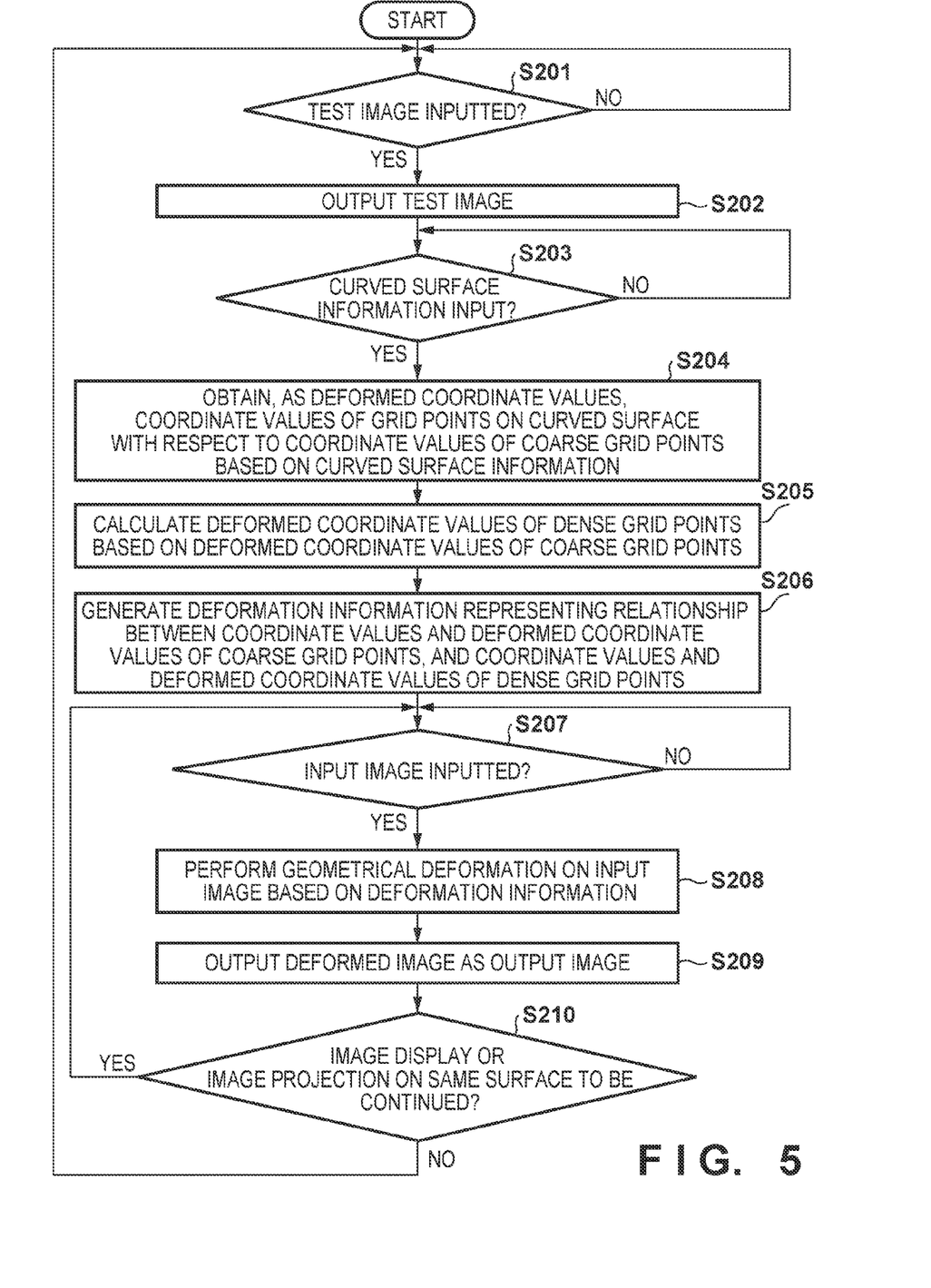
FIG. 5 is a flowchart showing image deformation processing.

Image deformation processing will be explained with reference to the flowchart of FIG. 5.

If a test image is input through the input interface 204 (S201), the image deformation unit 206 outputs the test image as an output image to the output interface 205 without performing deformation processing (S202).

If curved surface information is input through the user interface 201 (S203), the coordinate value obtaining unit 202 obtains, as deformed coordinate values based on the curved surface information, the coordinate values of grid points on a curved surface that correspond to the coordinate values of coarse grid points (S204).

The deformation information generation unit 203 calculates the deformed coordinate values of dense grid points between coarse grid points based on the deformed coordinate values of the coarse grid points (S205), and generates deformation information representing the relationship between the coordinate values and deformed coordinate values of the coarse grid points and the coordinate values and deformed coordinate values of the dense grid points (S206).

If an input image is input through the input interface 204 (S207), the image deformation unit 206 performs geometrical deformation on the input image based on the deformation information (S208), and outputs the deformed image as an output image to the output interface 205 (S209).

It is determined whether to continue image display or image projection on the same surface (S210). If image display or image projection on the same surface is to be continued, the process returns to step S207. If image display or image projection on the same surface is not to be continued, or if image display or image projection on a different surface is to be performed, the process returns to step S201.

[Apparatus Arrangement]

Figure 6:
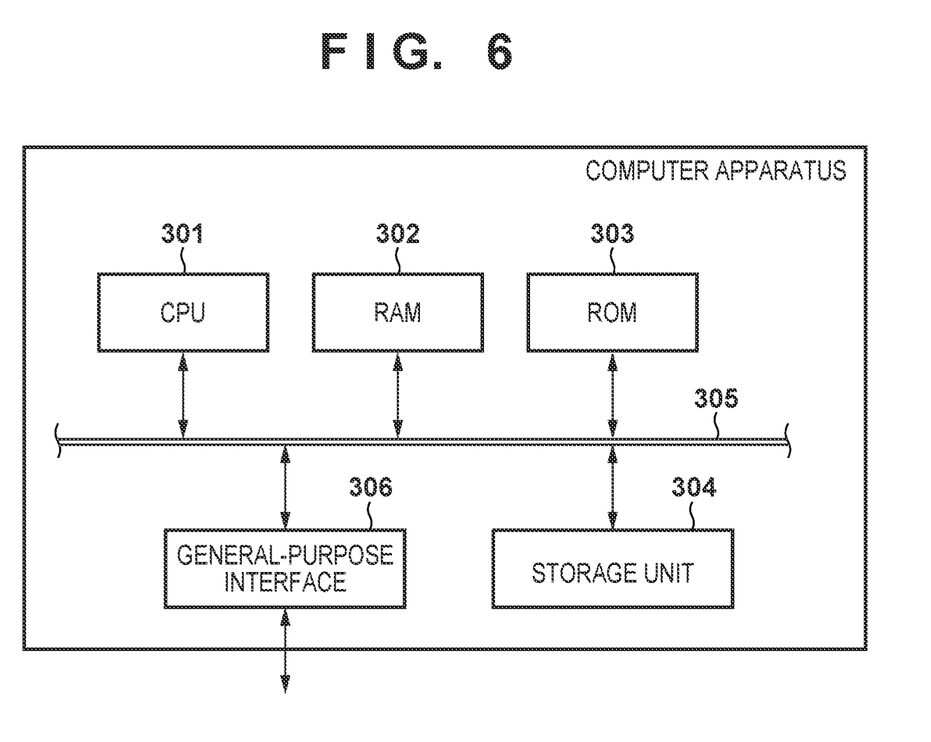
FIG. 6 is a block diagram showing the arrangement of a computer apparatus.

The arrangement of a computer apparatus functioning as the information processing apparatus in the first embodiment or the image processing apparatus 200 in the second embodiment is shown in the block diagram of FIG. 6.

A microprocessor (CPU) 301 executes an operating system (OS) and various programs stored in a read only memory (ROM) 303 or a storage unit 304 using a random access memory (RAM) 302 as a work memory, and controls building components (to be described later) through a system bus 305.

The storage unit 304 constituted by a hard disk drive (HDD), a solid state drive (SSD), a flash memory, or the like stores programs for executing curve estimation processing according to the first embodiment and image deformation processing according to the second embodiment. The CPU 301 loads the programs to the RAM 302 and executes them, implementing the processes described in the first and second embodiments.

A general-purpose interface 306 is a serial bus interface such as USB (Universal Serial Bus), and performs input/output of various data (test image, input image, output image, user instruction/input, and the like). For example, the general-purpose interface 306 functions as the user interface 201, the input interface 204, and the output interface 205 in the image processing apparatus 200 according to the second embodiment. Note that input/output of various data may be performed from/to a computer device, a display device, a projection device, or the like through a network interface and a wired or wireless network, instead of the general-purpose interface 306.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249198 filed Dec. 9, 2014 which is hereby incorporated by reference herein in its entirety.

What is claimed is:

1. An information processing apparatus for estimating a curve for a curved surface for correcting distortion of an image on the curved surface, the apparatus comprising:

one or more processors; and at least one memory coupled to the one or more processors, the at least one memory having instructions stored thereon which, when executed by the one or more processors, cause the information processing apparatus to:

set a plurality of anchor points at which a curve to be estimated passes sequentially through, the curve being estimated corresponding to a curved surface on which an image is to be displayed;

select four anchor points including a first anchor point, a second anchor point, a third anchor point and a fourth anchor point, which are successional from the plurality of anchor points, wherein the selection is sequentially performed from a start side or terminal side of the curve to be estimated for the curved surface;

set first and second control points based on the selected anchor points, wherein the first control point is set based on the first, second and third anchor points, and the second control point is set based on the second, third and fourth anchor points;

calculate a first quadratic Bezier curve connecting between the first, second, and third anchor points based on the first control point and the first and third anchor points, and calculate a second quadratic Bezier curve connecting between the second, third and fourth anchor points based on the second control point and the second and fourth anchor points; and estimate coordinate values of the curve to be estimated for the curved surface, wherein the curve connects the second anchor point and the third anchor point, based on the first quadratic Bezier curve between the second anchor point and the third anchor point and the second quadratic Bezier curve between the second anchor point and the third anchor point, wherein an ideal curve connects between the first, second, third and fourth anchor points, and wherein signs of errors between coordinate values of the ideal curve and coordinate values of the first quadratic Bezier curve between the second and third anchor points are opposite to signs of errors between coordinate values of the ideal curve and coordinate values of the second quadratic Bezier curve between the second and third anchor.

2. The apparatus according to claim 1, wherein:

the first, the second and the third anchor points are a first group of three anchor points which are located in the start side in the selected anchor points; and the second, the third and the fourth anchor points are second group of three anchor points which are located in the terminal side in the selected anchor points.

3. The apparatus according to claim 2, wherein the at least one memory stores further instructions, which when executed by the one or more processors, cause the information processing apparatus to:

obtain a first midpoint of a line segment connecting between the first anchor point located on the most start side and the third anchor point located on the most terminal side in the first group of three anchor points, set, as the first control point, a position having point symmetry with the first midpoint using the second anchor point located on intermediate of the first group of three anchor points as a center, obtain a second midpoint of a line segment connecting between the second anchor point located on the most start side and the third anchor point located on the most terminal side in the second group of three anchor points, and set, as the second control point, a position having point symmetry with the second midpoint using the third anchor point located on intermediate of the second group of three anchor points as a center.

4. The apparatus according to claim 3, wherein the at least one memory stores further instructions, which when executed by the one or more processors, cause the information processing apparatus to:

calculate, with regard to the first group of three anchor points located in the start side, the first quadratic Bezier curve including a quadratic Bezier curve connecting the first and second anchor points and a quadratic Bezier curve connecting the second and third anchor points, based on the first and third anchor points and the first control point; and calculate, with regard to the second group of three anchor points located in the terminal side, the second quadratic Bezier curve including a quadratic Bezier curve connecting the first and second anchor points and a quadratic Bezier curve connecting the second and third anchor points, based on the first and third anchor points and the second control point.

5. The apparatus according to claim 4, wherein the at least one memory stores further instructions, which when executed by the one or more processors, cause the information processing apparatus to calculate, as the coordinate values of the curve to be estimated, average values between coordinate values of the quadratic Bezier curve connecting the second and third anchor points calculated in the first group, and coordinate values of the quadratic Bezier curve connecting the first and second anchor points calculated in the second group.

6. The apparatus according to claim 1, wherein the at least one memory stores further instructions, which when executed by the one or more processors, cause the information processing apparatus to start the selection of the successional four anchor points from an anchor point corresponding to a count value, wherein, in a case when the estimation of the coordinate values is completed, the count value is incremented or decremented, and wherein, in a case when the count value is less or greater than a threshold value relating to a number of the plurality of anchor points, the at least one memory stores further instructions, which when executed by the one or more processors, cause the information processing apparatus to repeat the select step, the set first and second control points step, the calculate step, and the estimate step.

7. A method of estimating a curve for a curved surface for correcting distortion of an image on the curved surface, the method comprising:

using a processor to perform:

setting a plurality of anchor points at which the curve to be estimated passes sequentially through, the curve corresponding to a curved surface on which an image is to be displayed;

selecting four anchor points including a first anchor point, a second anchor point, a third anchor point and a fourth anchor point, which are successional from the plurality of anchor points, wherein the selection is sequentially performed from a start side or terminal side of the curve to be estimated for the curved surface;

setting first and second control points based on the selected anchor points, wherein the first control point is set based on the first, second and third anchor points, and the second control point is set based on the second, third and fourth anchor points;

calculating a first quadratic Bezier curve connecting between the first, second and third anchor points based on the first control point and the first and third anchor points, and calculating a second quadratic Bezier curve connecting between the second, third and fourth anchor points based on the second control point and the second and fourth anchor points; and estimating coordinate values of the curve to be estimated for the curved surface, wherein the curve connects the second anchor point and the third anchor point, based on the first quadratic Bezier curve between the second anchor point and the third anchor point and the second quadratic Bezier curve between the second anchor point and the third anchor point, wherein an ideal curve connects between the first, second, third and fourth anchor points, and wherein signs of errors between coordinate values of the ideal curve and coordinate values of the first quadratic Bezier curve between the second and third anchor points are opposite to signs of errors between coordinate values of the ideal curve and coordinate values of the second quadratic Bezier curve between the second and third anchor.

8. A non-transitory computer readable medium storing a computer-executable program for causing a computer to perform a method of estimating a curve for a curved surface for correcting distortion of an image on the curved surface, the method comprising:

setting a plurality of anchor points at which the curve to be estimated passes sequentially through, the curve corresponding to a curved surface on which an image is to be displayed;

selecting four anchor points including a first anchor point, a second anchor point, a third anchor point and a fourth anchor point, which are successional from the plurality of anchor points, wherein the selection is sequentially performed from a start side or terminal side of the curve to be estimated for the curved surface;

setting first and second control points based on the selected anchor points, wherein the first control point is set based on the first, second and third anchor points, and the second control point is set based on the second, third and fourth anchor points;

calculating a first quadratic Bezier curve connecting between the first, second and third anchor points based on the first control point and the first and third anchor points, and calculating a second quadratic Bezier curve connecting between the second, third and fourth anchor points based on the second control point and the second and fourth anchor points; and estimating coordinate values of the curve to be estimated for the curved surface, wherein the curve connects the second anchor point and the third anchor point, based on the first quadratic Bezier curve between the second anchor point and the third anchor point and the second quadratic Bezier curve between the second anchor point and the third anchor point, wherein an ideal curve connects between the first, second, third and fourth anchor points, and wherein signs of errors between coordinate values of the ideal curve and coordinate values of the first quadratic Bezier curve between the second and third anchor points are opposite to signs of errors between coordinate values of the ideal curve and coordinate values of the second quadratic Bezier curve between the second and third anchor.

9. The information processing apparatus according to claim 1, wherein the instructions, when executed by the one or more processors, further cause the information processing apparatus to estimate, as a coordinate value of the curve to be estimated for the curved surface, an average value of a coordinate value of the first quadratic Bezier curve and a coordinate value of the second quadratic Bezier curve.

* * * * *